J. W. WILLIAMS.
AUTO WHEEL.
APPLICATION FILED MAR. 22, 1917.
1,321,075.
Patented Nov. 4, 1919.
3 SHEETS—SHEET 1.
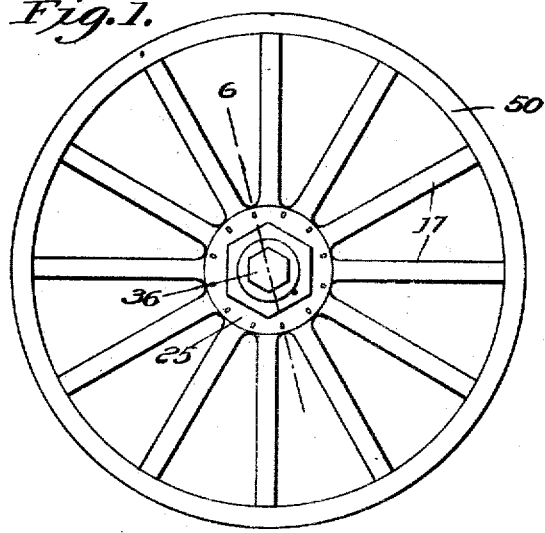
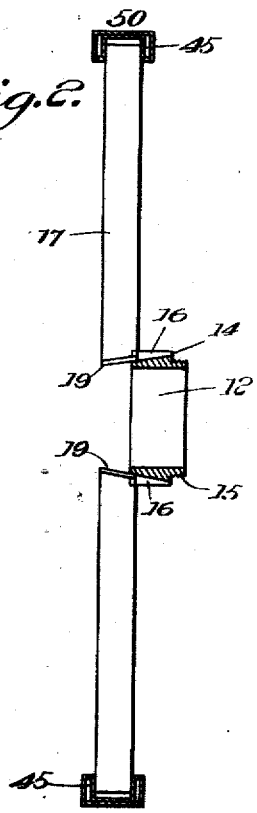
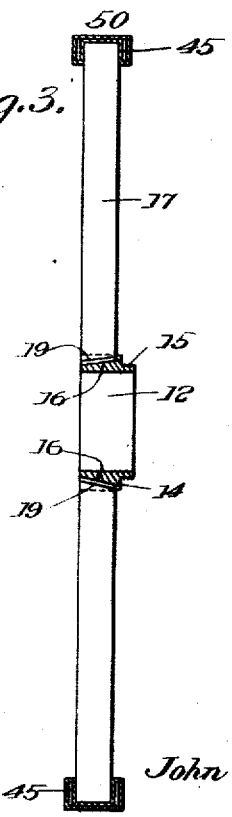
Inventor
John W. Williams
By Harry C. Schroeder
Attorney

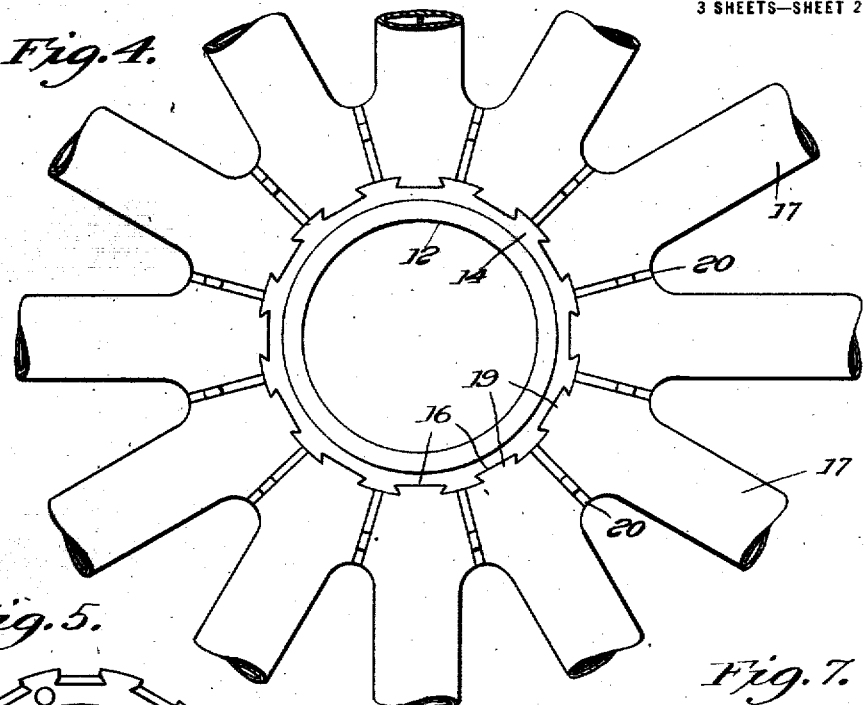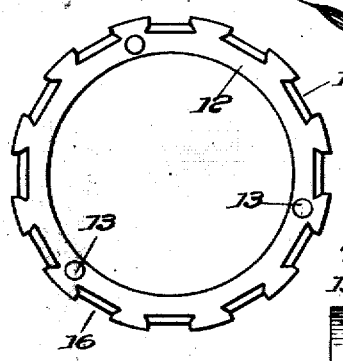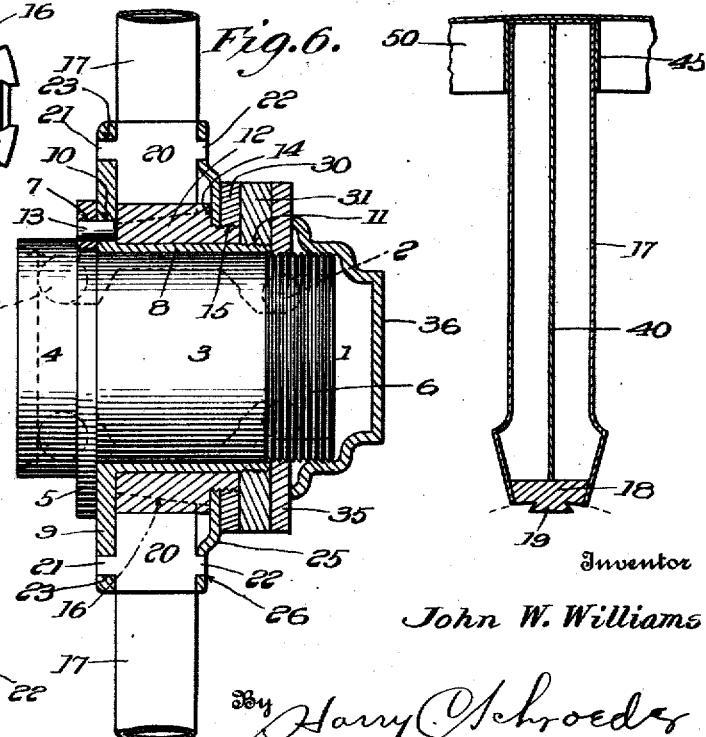

J. W. WILLIAMS.
AUTO WHEEL.
APPLICATION FILED MAR. 22, 1917.

1,321,075.

Patented Nov. 4, 1919
3 SHEETS—SHEET 3.

Inventor
John W. Williams
By Harry C. Schroeder
Attorney

UNITED STATES PATENT OFFICE.

JOHN W. WILLIAMS, OF SANTA ROSA, CALIFORNIA, ASSIGNOR TO WESTERN STEEL AUTO-WHEEL COMPANY, OF RENO, NEVADA, A CORPORATION.

AUTO-WHEEL.

1,321,075. Specification of Letters Patent. Patented Nov. 4, 1919.

Application filed March 22, 1917. Serial No. 156,569.

*To all whom it may concern:*

Be it known that I, JOHN W. WILLIAMS, citizen of the United States, residing at Santa Rosa, in the county of Sonoma and State of California, have invented certain new and useful Improvements in Auto-Wheels, of which the following is a specification.

This invention is an improved automobile wheel.

The invention comprises a metal automobile wheel, the parts of which are readily interchangeable.

The invention is illustrated in the accompanying drawings which form a part of this specification and the appended claims.

Referred to the drawings:—

Figure 1 is a side view of the assembled wheel.

Figs. 2 and 3 are sectional views illustrating how the spokes are assembled in the rim and spoke seat of the wheel.

Fig. 4 is a view showing the spokes seated in the spoke seat.

Fig. 5 is an end view of the spoke seat.

Fig. 6 is a sectional view through the central portion of the wheel taken on line 6 of Fig. 1.

Fig. 7 is a sectional view through one of the spokes and the rim.

Fig. 8 is a cross section of one of the spokes.

Fig. 16 is a view of one of the spoke filler lugs.

Figure 9:
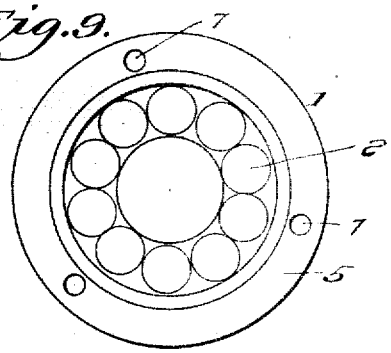
Fig. 9 is an end view of the hub boxing.
Figure 10:
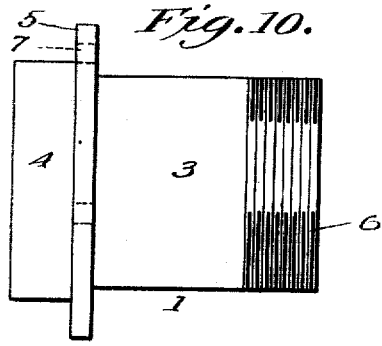
Fig. 10 is a side view of the hub boxing.
Figure 11:
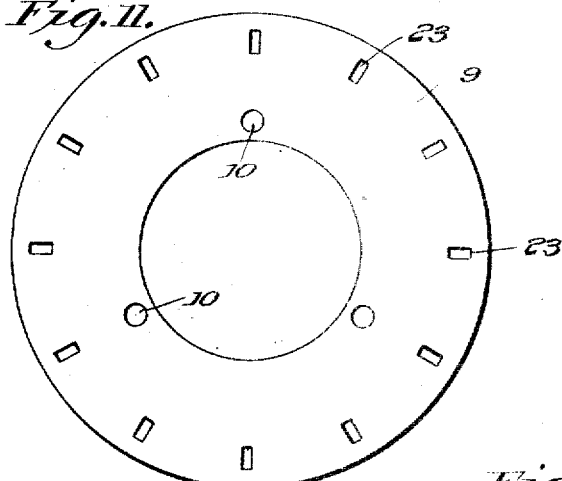
Fig. 11 is an end view of the hub sleeve.
Figure 12:
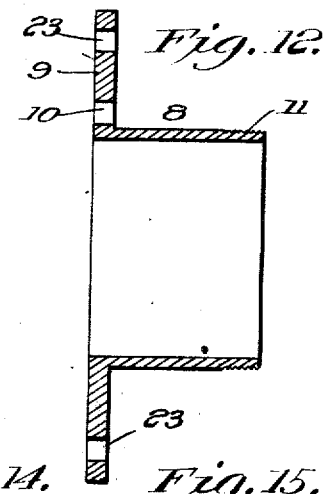
Fig. 12 is a longitudinal section of the hub sleeve.
Figure 13:
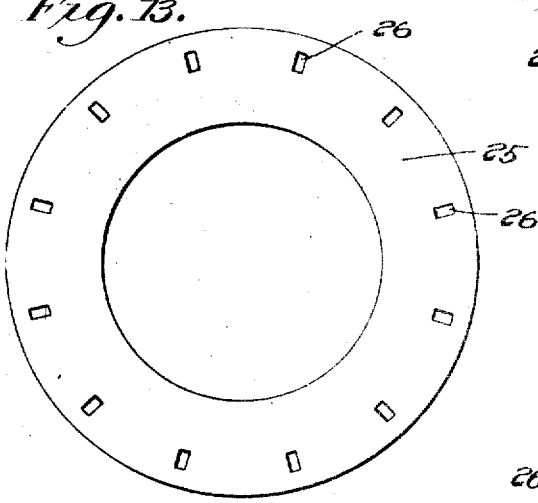
Fig. 13 is an end view of the spoke alinement plate.
Figure 14:
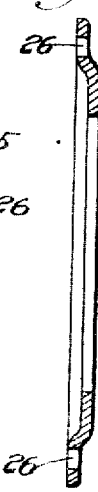
Fig. 14 is a cross section of the spoke alinement plate.
Figure 15:
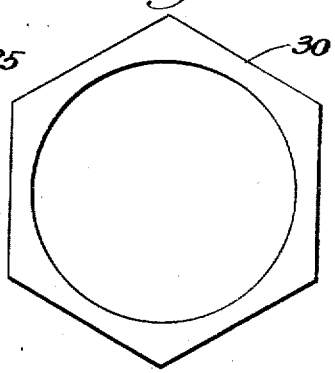
Fig. 15 is a view of the locking nut for engaging the spoke alinement plate and locking the plate in position on the spoke seat.

In the drawing 1 indicates the hub of the wheel in which is arranged ball bearing 2 for engaging and turning on the automobile axle. The hub has cylindrical portions 3 and 4 and an intermediate annular flange 5. The outer end of the cylindrical portion 3 has a thread 6. The flange 5 is provided with holes 7, the purpose of which will be described hereinafter. A hub sleeve 8 is provided to receive the hub 1, and is provided with an annular flange 9 for engaging the hub flange 5 to position the hub in the sleeve. The sleeve flange 9 is provided with holes 10 adapted to register with the holes 7 in the hub flange 5 for the purpose hereinafter described. The outer end of the hub sleeve has a thread 11. A hub seat 12 fits over the sleeve 8 with one end in engagement with the sleeve flange 9. Said end of the hub seat has projecting pins 13 which project through the holes 10 and 7 in the sleeve and hub flanges 9 and 5 respectively, and lock the hub, hub sleeve and spoke seat together so that they will rotate together. The other end of the spoke seat is reduced leaving a shoulder 14, and the reduced end has a thread 15, the purpose of which will be hereinafter described. The spoke seat is provided with a plurality of dove-tailed grooves 16 in its periphery spaced at equal distances apart, which are inclined outwardly from the rear toward the front end of the spoke seat. 17 indicates the spokes of the wheel, which are metal tubing, the adjacent faces of the inner ends of which diverge outwardly. Wedge blocks 18 are wedged in the diverging hub ends of the spokes and close said spoke ends. Dove-tailed tongues 19 are formed on the outer face of the blocks 18, which tongues are adapted to sli i ′ the grooves 16 in the hub seat and engage the dove-tailed sides of said grooves to hold the hub ends of the spokes firmly in the hub seat. When the hub ends of the spokes are seated in the hub seat the diverging adjacent faces of the spokes rest a uniform distance apart throughout their entire length, between which is placed spoke filler plates 20 which are of a uniform thickness throughout and may be stamped out of sheet metal. The plates 20 have lugs 21 and 22, the lugs 21 fitting in slots 23 in sleeve flange 9, which flange engages the rear face of the spokes 17. A spoke alinement plate 25 fits over the reduced front end of the hub seat 12 against the shoulder 14 thereof and engages the front face of the spokes, said plate being provided with slots 26 which receive the lugs 22 of spoke filler plates 20. The engagement of the lugs 21 and 22 in the slots 23 and 26 of the flange 9 and plate 25 respectively holds the plates securely between the spokes. A nut 30 screws on the thread 15 on the reduced front end of the hub seat 12 against the spoke alinement plate 25, and a nut 31 screws on the thread 11 on the front end of sleeve 8 against the front end of the hub seat 12, whereby the sleeve plate 9 and the spoke alinement plate 25 are drawn toward each other and the flange 9 drawn against the rear end of the hub seat, and the spokes clamped between said flange and plate in properly alined position on the hub seat. A nut 35 screws on the thread 6 on the front end of the hub 1 against the nut 31 or front end of the sleeve 8 and draws the hub 1 forwardly and the hub flange 5 into engagement with sleeve flange 9, thus properly positioning the hub in the wheel. A cap 36 screws on the thread 6 on the hub 1 and incloses the end of the hub. Ribs 40 extend diametrically across the spokes 17 from the blocks 18 to the outer ends of the spokes and reinforce the spokes. The outer ends of the spoke fit in sleeves 45 in the wheel felly 50, whereby the spokes are secured to the felly. The felly is metal and may be stamped out of sheet metal.

The wheel is assembled as follows:

The outer ends of the spokes are first inserted in the felly sleeves 45. The front ends of the forwardly and outwardly inclined tongues 19 on the hub ends of the spokes are then introduced into the rear ends of the forwardly and outwardly inclined dovetailed grooves 16 in the hub seat 12, and the hub seat is forced rearwardly whereby the tongues 19 are forced up into the grooves 16 and the spokes are forced outwardly longitudinally by the wedge action of the engagement of the tongues and grooves thus forcing the outer ends of the spokes all the way into the felly sleeves 45. The hub sleeve 8 is then introduced into the hub seat through the rear end thereof, and the pins 13 are introduced through the holes 10 in flange 9. The filler plates 20 are then placed between the adjacent faces of the hub ends of the spokes and the lugs 21 introduced in slots 23 in sleeve flange 9. The spoke alinement plate 25 is then slipped over the reduced front end of the hub seat, and the filler plate lugs 22 introduced in slots 26 in the spoke alinement plate 25. The nuts 30 and 31 are then respectively screwed on the front threaded ends of the hub seat and hub sleeve, and their engagement with the spoke alinement plate and the forward end of hub seat respectively draws the sleeve flange 9 and spoke alinement plate 25 toward each other until the flange 9 rests against the rear end of hub seat 12, and the spoke alinement plate 25 engages the hub seat shoulder 14, whereby the hub ends of the spokes are clamped between said flange and plate and the spokes properly alined on the hub seat, and all of said parts locked to rotate together. The hub 1 is then introduced into the rear end of hub sleeve 8 and the hub seat pins 13 introduced through the holes 7 in the hub flange 5. The nut 35 is then screwed on the thread 6 on the front end of the hub, against the front end of the hub sleeve and nut 31, whereby the hub is drawn forwardly in the hub sleeve until the hub flange 5 engages the hub sleeve flange 9, thus properly positioning the hub in the wheel and locking the hub to the hub sleeve so that the hub will turn with the other parts of the wheel. The cap 36 is then screwed on the thread 6 on the front end of the hub and the front end of the hub is inclosed. The wheel is now assembled and ready to be placed on the axle of an automobile.

Having decribed my invention, I claim as new and desire to secure by Letters Patent:

1. An automobile wheel comprising a hub, a hub sleeve fitting over said hub, a spoke seat detachably fitting over said hub sleeve, means for locking said hub, hub sleeve and hub seat so as to turn together, spokes, means for seating the inner ends of said spokes on said spoke seat, and a felly connected to the outer ends of said spokes.

2. An automobile wheel comprising a hub, a hub sleeve fitting over said hub, a spoke seat fitting over said hub sleeve, apertured parts on said hub and hub sleeve, a pin on said spoke seat adapted to fit in the apertures of said apertured parts to lock said hub, hub sleeve and spoke seat, so as to turn together, spokes seated on said spoke seat, and a felly connected to the outer ends of said spokes.

3. An automobile wheel comprising a hub, a hub sleeve fitting over said hub, a spoke seat fitting over said hub sleeve, spokes adapted to seat on said spoke seat, a flange on said hub sleeve adapted to engage one side of the spokes, a plate fitting on said spoke seat and engaging the other side of said spokes, a nut screwing on said spoke seat against said plate, and a nut screwing on the end of said hub sleeve against said spoke seat for clamping the spokes on said spoke seat between said flange and said plate, and a felly connected to the outer ends of said spokes.

4. An automobile wheel comprising a hub, a hub sleeve fitting over said hub, a spoke seat fitting over said hub sleeve, said spoke seat having axially inclined seats, spokes, the inner ends of said spokes being adapted to seat on said inclined seats, a flange on said hub sleeve adapted to engage one side of the spokes, a plate fitting on said spoke seat and engaging the other side of said spokes, a nut screwing on said spoke seat against said plate and a nut screwing on the end of said hub sleeve against said spoke seat for drawing said spokes up the inclined seats of said spoke seat and for clamping the spokes on said spoke seat between said flange and said plate, and a felly connected to the outer ends of said spokes.

5. An automobile wheel comprising a hub, a hub sleeve fitting over said hub, a hub seat fitting over said hub sleeve, spokes adapted to seat on said hub seat, a flange on said hub sleeve adapted to engage one side of the spokes, a plate fitting on said spoke seat and engaging the other side of said spokes, a nut screwing on said spoke seat against said plate, and a nut screwing on the end of said hub sleeve against said hub seat for clamping the spokes on said spoke seat between said flange and said plate, a felly connected to the outer ends of said spokes, a flange on one end of said hub, and a nut screwing on the other end of said hub against said hub sleeve for drawing said hub flange into engagement with said hub sleeve flange.

6. An automobile wheel comprising a hub, a hub sleeve fitting over said hub, a hub seat fitting over said hub sleeve, spokes adapted to seat on said hub seat, a flange on said hub sleeve adapted to engage one side of the spokes, a plate fitting on said spoke seat and engaging the other side of said spokes, a nut screwing on said spoke seat against said plate, and a nut screwing on the end of said hub sleeve against said hub seat for clamping the spokes on said spoke seat between said flange and said plate, a felly connected to the outer ends of said spokes, a flange on one end of said hub and a nut screwing on the other end of said hub against said hub sleeve for drawing said hub flange into engagement with said hub sleeve flange, said hub flange and said hub sleeve flange being provided with holes and a pin on said spoke sleeve adapted to fit in said holes to lock the hub, hub sleeve and spoke seat so as to turn together.

7. An automobile wheel comprising a hub, a hub sleeve fitting over said hub, a hub seat fitting over said hub sleeve, spokes adapted to seat on said hub seat, a flange on said hub sleeve adapted to engage one side of the spokes, a plate fitting on said spoke seat and engaging the other side of said spokes, a nut screwing on said spoke seat against said plate, and a nut screwing on the end of said hub sleeve against said hub seat for clamping the spokes on said spoke seat between said flange and said plate, a felly connected to the outer ends of said spokes, and filler plates between the inner ends of the spokes.

8. An automobile wheel comprising a hub, a hub sleeve fitting over said hub, a hub seat fitting over said hub sleeve, spokes adapted to seat on said hub seat, a flange on said hub sleeve adapted to engage one side of the spokes, a plate fitting on said spoke seat and engaging the other side of said spokes, a nut screwing on said spoke seat against said plate, and a nut screwing on the end of said hub sleeve against said hub seat for clamping the spokes on said spoke seat between said flange and said plate, and a felly connected to the outer ends of said spokes, said hub sleeve flange and said plate being provided with slots, filler plates between the inner ends of said spokes, lugs on said filler plates adapted to fit in said slots.

9. An automobile wheel comprising a hub, a spoke seat mounted on said hub, seats in said spoke seat, tubular spokes, blocks wedged into and closing the inner ends of said spokes, seat engaging means on said blocks for engaging the seats on said spoke seat to hold the spokes on said seat, and a felly connected to the outer ends of said spokes.

In testimony whereof I affix my signature.
JOHN W. WILLIAMS.